Sept. 24, 1929.   V. STRAFINO   1,729,558
WATER DRAWING APPARATUS FOR AIRCRAFT
Filed Sept. 5, 1928   3 Sheets-Sheet 2
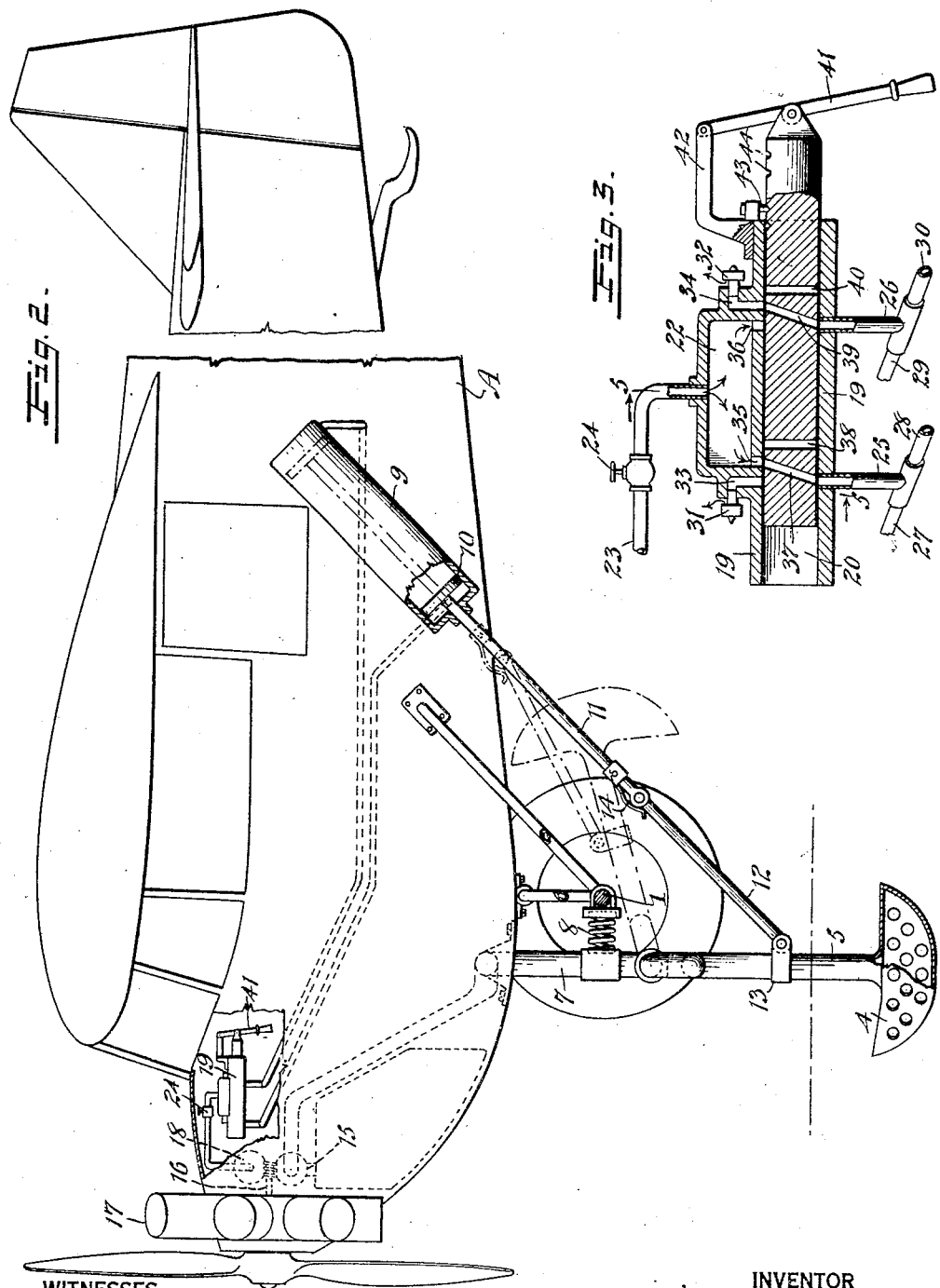
WITNESSES
Frank M. Pratt
S.W. Foster
INVENTOR
Vincent Strafino
BY
ATTORNEY Sept. 24, 1929.   V. STRAFINO   1,729,558
WATER DRAWING APPARATUS FOR AIRCRAFT
Filed Sept. 5, 1928   3 Sheets-Sheet 3
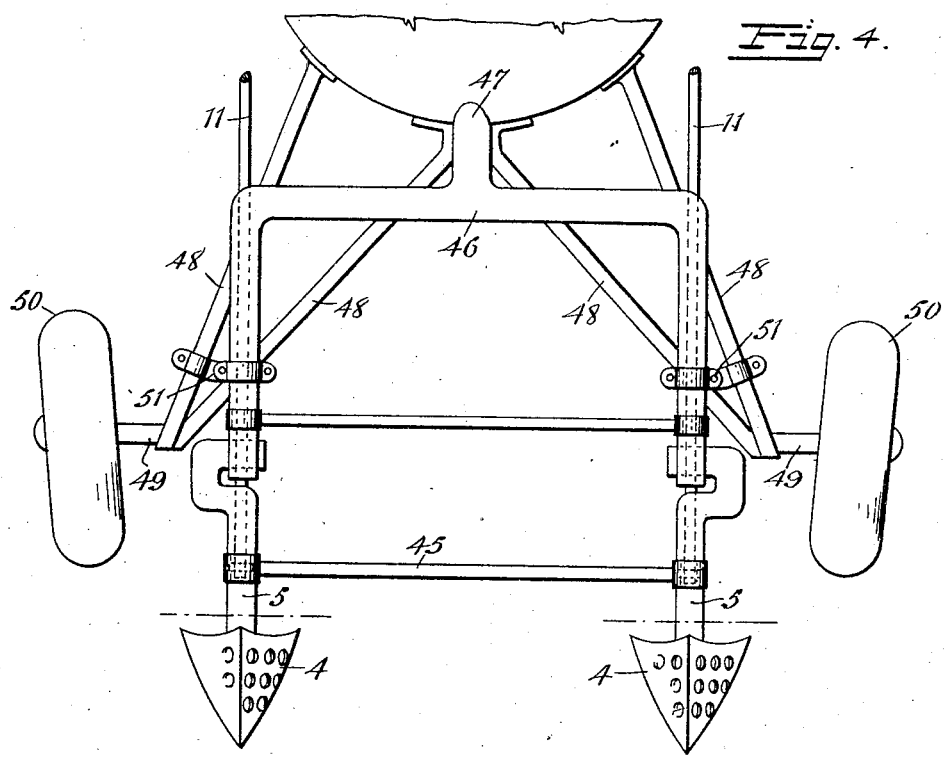
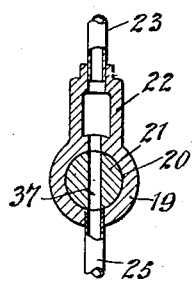
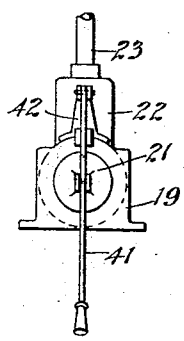
WITNESSES
Frank M. Pratt
A.W. Foster
INVENTOR
Vincent Strafino
BY
ATTORNEY Patented Sept. 24, 1929

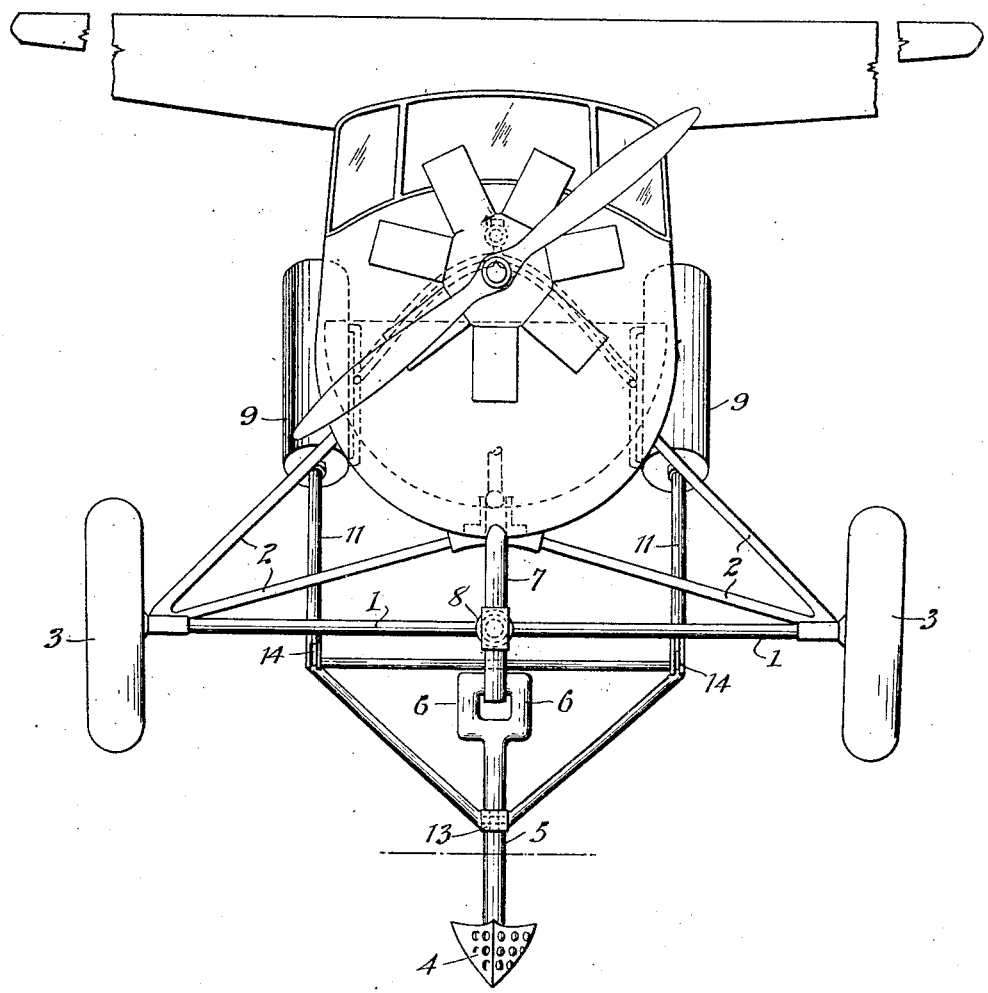

1,729,558

UNITED STATES PATENT OFFICE

VINCENT STRAFINO, OF NEW YORK, N. Y.

WATER-DRAWING APPARATUS FOR AIRCRAFT

Application filed September 5, 1928. Serial No. 304,055.

This invention relates to water drawing apparatus for aircraft.

The primary object of the invention is to provide an airplane or other form of aircraft with means which permit water to be drawn into the aircraft while the latter is in motion.

A further object is to provide a water drawing apparatus of the character stated which will not interfere in any way with the landing gear of the aircraft and which can be moved from operative to inoperative position through the medium of a pneumatically controlled mechanism.

With these and other objects in view, the invention consists in certain novel features of construction and combinations and arrangements of parts which will be more fully hereinafter described and pointed out in the claims.

In the accompanying drawings—

Figure 1 is a view in front elevation of an airplane provided with my improved water drawing apparatus;

Figure 2 is a broken view in side elevation of the aircraft and the water drawing apparatus, portions being shown in section for clearness;

Figure 3 is a view in longitudinal section of my improved valve for controlling the direction of air to operate the apparatus;

Figure 4 is a fragmentary view in front elevation illustrating a modified form of my invention;

Figure 5 is a view in section on the staggered line 5—5 of Figure 3;

Figure 6 is a view in end elevation of the valve shown in Figure 3.

A represents an aircraft, and I use this reference character to include all parts of an ordinary aircraft with the exception of the landing gear, as I employ separate reference characters for different parts of the landing gear.

Referring more particularly to Figures 1 and 2 of the drawings, 1 represents a transverse shaft of the landing gear supported by suitable braces 2 and carrying landing wheels 3. With a landing gear of this character the axle 1 extends transversely below the fuselage of the aircraft, as indicated.

4 represents a perforated water intake plow which is preferably shaped somewhat after the manner of the bow of a ship so as to offer as little resistance as possible in its movement through the water, and this perforated plow is carried by a pipe 5 having branches 6, 6 at its upper end pivotally connected to a pipe 7 for supplying water to any desired part of the aircraft.

This pipe 7 may be secured in any approved manner to the aircraft or fuselage of the aircraft, and a coiled spring 8 is preferably provided between the back of the pipe 7 and against the axle 1 and operatively connected with these parts in any desired manner so as to cushion the shock of contact of the plow with the water and prevent undue strain on the parts.

The fuselage of the aircraft supports a pair of air cylinders 9, 9 in which pistons 10 are mounted, and piston rods 11 are secured to the pistons 10 and move through the ends of the cylinders.

These rods 11 are connected by links 12 with a collar 13 on pipe 5. The connections between the links 12 and the collar 13 constitute pivotal connections, and the connections between the links 12 and rods 11 constitute pivotal connections but are in the nature of elbow joints. Fingers 14 are provided on the rods 11 and engage the links 12 so as to compel said links to exert a downward pressure on the pipe 5 and plow 4 when the pistons are moved forwardly and downwardly. In other words, by the provision of these fingers 14 any possibility of upward pivotal movement of the pipe 5 and plow 4 when the latter are elevated is rendered impossible.

In Figure 2 the parts are shown in full lines in the position for taking water while the aircraft is in flight, and of course it is to be understood that the pilot or operator will cause the aircraft to move close to the water for a distance sufficient to allow water to be drawn into the aircraft.

I of course do not limit myself to any particular means for actually sucking water into the aircraft but I have illustrated in dotted lines in Figure 2 a pump 15 which may be operated by a worm shaft 16 operatively connected to the motor 17 of the aircraft. This shaft 16 may also operate an air pump or compressor 18 for supplying air to the cylinders 9, 9 to control the movements of the apparatus.

As I desire to move the plow 4 and suction pipe 5 positively in both directions it is necessary to provide a valve which will accomplish this, and I show in section in Figure 3 an improved form of valve which will answer the purpose.

The casing 19 of my improved valve has a longitudinal bore 20 for the movement of a slide valve 21. An air inlet chest 22 is formed on the casing 19 and is connected by a pipe 23 with the air pump 18 or other source of supply, and is preferably provided with a valve 24 for manual operation.

Air manifold pipes 25 and 26 communicate with the interior of the valve casing 19. Branch pipes 27 and 28 connect the manifold 25 with the lower ends of the cylinders 9, and branch pipes 29 and 30 connect the manifold 26 with the upper or rear ends of the cylinders 9.

Exhaust check valves 31 and 32 are provided at the outlets of exhaust ports 33 and 34 in the casing 19. Inlet ports 35 and 36 connect the air chest 22 with the bore 20 of casing 19, and four ports or passages 37, 38, 39 and 40 are formed in the valve 21.

This valve 21 may be manually moved by a lever 41 connected between its ends to the valve and pivotally supported by a bracket 42, and a spring pressed head 43 on the casing 19 is adapted to engage in any of a series of notches 44 in the valve 21 to hold the valve in any position of adjustment and prevent accidental displacement.

Figure 3 illustrates the valve in a position to admit air to the manifold 25, and branch pipes 27 and 28 communicate with the lower ends of the cylinders 9 and this will permit air to force the pistons 10 upwardly and rearwardly and elevate the air intake plow to hold it in elevated position.

When the valve 21 is moved to the left of Figure 1 the ports will be so alined as to admit air to the upper ends of the cylinders to force the plow downwardly and hold it in this position.

It will of course be noted that the ports are so arranged that when air is forced into one end of the cylinder the air is permitted to exhaust from the other end of the cylinder, and when the ports are out of alinement a neutral position is had.

In the modification illustrated in Figure 4 I show a pair of my improved water intake plows 4 connected to pipes 5, these pipes 5 being rigidly connected by a cross rod 45 so as to compel them to move together. The rods 45 have pivotal connection with a forked suction pipe 46 having an outlet 47 communicating with the interior of the aircraft.

This design of apparatus is especially adapted for a landing gear having no transverse shaft but instead is provided with laterally projected braces 48 supporting axle studs 49 on which wheels 50 are mounted. With a construction of this kind the forked suction pipe 46 may be connected directly with the braces 48 by coupling means such as indicated at 51, and it will of course be understood that the plows are operated in exactly the same manner as the single plow in the form first illustrated.

With an apparatus such as above described there is no necessity for the aircraft stopping to take on water as it may take the water while in motion, and all operations of the apparatus are under the control of the operator in the aircraft.

Various changes and alterations might be made in the general form of the parts described without departing from my invention and hence I do not limit myself to the precise details set forth but consider myself at liberty to make such changes and alterations as fairly fall within the spirit and scope of the appended claims.

I claim:

1. The combination with an aircraft, of a landing gear on the aircraft, a suction pipe communicating with the interior of the aircraft and operatively connected to the landing gear, a pipe pivotally connected to the suction pipe, a perforated water intake plow at the free end of said pivoted pipe, and pneumatic means for positioning said plow in a plane below the landing gear to take water while the craft is in motion and elevate the plow out of such position.

2. The combination with an aircraft and a landing gear thereon, of a water intake device pivotally connected to the landing gear, means on the aircraft controlled from the pilot's seat to raise and lower the water intake device so as to position the same either in a plane below the landing gear or in a plane above the same, and cushioning means between the water intake device and the landing gear whereby the shock of contact of the water intake device with the water is cushioned.

3. The combination with an aircraft and a landing gear thereon, of a water intake device pivotally connected to the landing gear, means on the aircraft controlled from the pilot's seat to raise and lower the water intake device so as to position the same either in a plane below the landing gear or in a plane above the same, and pneumatic mechanism operatively connected with the water intake device and the controlling means for positively positioning the water intake device.

Signed at New York, in the county of New York and State of New York, this 1st day of September, A. D. 1928.

VINCENT STRAFINO.